United States Patent Office 2,701,251
Patented Feb. 1, 1955

2,701,251

PROCESS OF PRODUCING INDOLEACETIC ACIDS AND NEW INDOLEACETIC ACIDS PRODUCED THEREBY

Sidney W. Fox and Milon W. Bullock, Ames, Iowa, assignors to Iowa State College Research Foundation, Inc., Ames, Iowa, a corporation of Iowa No Drawing. Application April 21, 1951,
Serial No. 222,296

7 Claims. (Cl. 260—319)

Our invention relates to a process of producing indoleacetic acids and new indoleacetic acids produced thereby. More particularly, our invention relates to a process for producing indole-3-acetic acids from glutamic acid and to new indole-3-acetic acids substituted in the benzene ring.

Indoleacetic acid is a known plant hormone, which has utility as a rooting hormone and in other phytological applications which depend on its function as a growth hormone. Our new process for the synthesis of indoleacetic acid makes possible the modification of indoleacetic acid by the introduction of one or more substituent groups in the benzene ring. We have discovered that the benzene ring substituted indoleacetic acid produced by our process also have utility as plant hormones, and that certain of these novel substituted indoleacetic acids display an unexpectedly higher level of activity than indoleacetic acid itself.

Heretofore the known methods for the production of indoleacetic acid have involved relatively lengthy synthesis procedures in which the steps presented control problems. All of these processes of which we have knowledge produce only relatively poorer yields of indoleacetic acid, or require expensive intermediates, and are therefore suitable only for laboratory synthesis of indoleacetic acid. Furthermore, these prior methods are not feasible for the preparation of many indoleacetic acids substituted in the benzene ring. Also, these processes have suffered from the defect of requiring expensive starting materials which rendered them uneconomical on a commercial basis. These defects and inadequacies have not been satisfactorily overcome previous to the present invention in spite of the potential commercial demand for indoleacetic acids.

It is therefore an object of our invention to provide a process for the production of indoleacetic acid which is easier and cheaper to carry out, and which can be controlled to produce greatly improved yields of the desired product. It is a further object of our invention to provide a process for the production of indoleacetic acids having substituent groups in the benzene ring. More specifically, it is an object of our invention to provide a process for the production of indoleacetic acid and substituted indoleacetic acids using comparatively inexpensive glutamic acid as a starting material. It is a still further object of our invention to devise a process in which many of the steps of the synthesis of indoleacetic acid from glutamic acid can be carried out without the necessity for the recovery or isolation of intermediate compounds. Further objects and advantages will appear as the specification proceeds.

In general, our process involves the production of indoleacetic acids from glutamic acid as a starting material by way of the intermediate compounds of succinaldehydic acid, succinaldehydic acid phenylhydrazone, and ethyl indoleacetate. In more detail, the steps in our process can be represented by the following group of chemical equations, which are intended to be merely typical of one phase of our invention and not limiting as to the exact reactants employed.

(1)
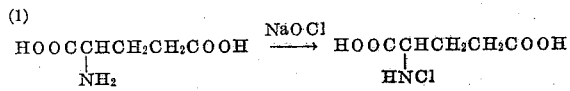

(2) 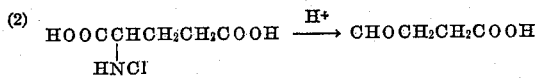

(3) 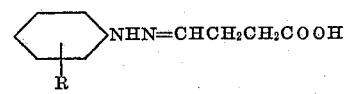

wherein R can be hydrogen or one or more substituents in the benzene ring such as alkyl groups or halogen atoms.

(4) 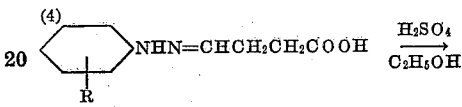

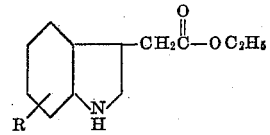

5) 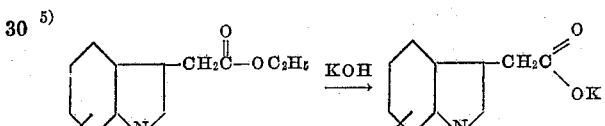

(6) 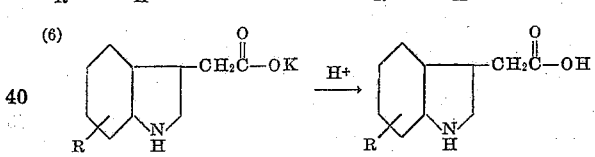

In carrying out our process, we have found that the acidification in step (2) results in the production of a small quantity of α-ketoglutaric acid along with the desired succinaldehydic acid. As will subsequently be explained in detail the α-ketoglutaric acid by-product does not have to be removed from the reaction mixture, but can be precipitated as its phenylhydrazone derivative in step (3) along with the desired product. At this point, the α-ketoglutaric acid phenylhydrazone can be separated from the succinaldehydic phenylhydrazone if desired, or both compounds can be subjected to the cyclization of step (4) and thereafter recovered by the reactions of steps (5) and (6) as 2-carboxyindole-3-acetic acids and indole-3-acetic acids.

In the product phase of our invention, we have discovered that when indole-3-acetic acid is substituted in the benzene ring with at least one halogen atom, and particularly at least one chlorine atom, the resulting compound shows an unexpectedly higher level of activity as a plant hormone than does indoleacetic acid itself. For example, it has been found that 5-chloroindoleacetic acid is more inhibitory to sunflower tumor tissue than indoleacetic acid. It seems probable that the halogen substituents and particularly the chlorine substituents serve to delay catabolism by the plant, a fact which increases their potency as hormones. The potency or level of activity of the indoleacetic acids having at least one chlorine substituent in the benzene ring makes possible their use as weed eradicators.

Steps (1) and (2) of our process as indicated in the preceding equations involve the hydrolytic deaminative decarboxylation of glutamic acid to produce succinaldehydic acid. These steps are an extremely important part of our synthesis since succinaldehydic acid has not previously been available by methods of production sufficiently economical to make commercially feasible its synthesis into indoleacetic acids, even if such methods had been known.

In general, step (1) can be carried out by dissolving a quantity of glutamic acid in an aqueous basic solution and then mixing a chlorine bleaching compound therewith, or a compound capable of yielding a chlorine bleaching compound. While various chlorine bleaching compounds capable of donating chlorine atoms to the amine groups of the glutamic acid can be utilized, we have found it desirable to use an alkali metal or an alkaline earth metal hypochlorite, such as sodium hypochlorite or calcium hypochlorite. Excellent results are also obtained by using Chloramine-T (sodium p-toluene-sulfochloramine). We can employ compounds capable of yielding a chlorine bleaching compound such as the N-chlorosulfonamides. We have also found it advantageous to add the chlorine bleaching compound to the reaction mixture in the form of an aqueous solution.

As previously pointed out the reaction between glutamic acid and the chlorine bleaching compound is preferably carried out in an aqueous basic solution. We have found it desirable to use a relatively strong base in the reaction mixture such as an alkali metal hydroxide. In particular, sodium hydroxide and potassium hydroxide have been found to be particularly suitable.

We have found that agitation or mixing of the reaction mixture is sufficient to produce the reaction; however, if desired the reaction mixture can be slightly warmed above the normal room temperature to accelerate the reaction. The end point or completion of the reaction can be conveniently determined by noting at what time a negative test is obtained with starch-iodine paper. The proportions of the reactants is not especially critical for the operativeness of our process. It is desirable, however, to utilize sufficient bleaching compound to supply chlorine to all of the glutamic acid employed, in other words a one-to-one molar ratio.

We have found that it is not necessary to recover the product produced in step (1) of the reaction, although this can be done if desired, but that it is more convenient to carry out step (2) of the reaction directly upon the reaction mixture obtained from step (1). In general, step (2) consists merely of the acidification of the reaction mixture from step (1) or of a solution containing the α-N-chloroaminoglutaric acid produced in step (1). Preferably, we employ relatively strong inorganic or mineral acids such as hydrochloric acid or sulfuric acid.

In carrying out this acidification step, we have found that it is sufficient to simply mix the acid employed with the reaction mixture containing the product of step (1). However, if it is desired to accelerate the reaction rate, the reaction mixture may be slightly warmed above room temperature as in step (1). If the reaction mixture is warmed, we have found it desirable to keep its temperature well below the boiling point of the mixture. During the reaction, carbon dioxide is evolved in the form of bubbles, and thus the substantial completion of the reaction may be noted by the stopping of the bubble formation. If desired, the actual end point can be determined by noting when a negative test is obtained with a starch-iodide paper. As previously pointed out, the acidification step results in the production of a small quantity of α-ketoglutaric acid.

We have also found that the succinaldehydic acid produced in step (2) does not have to be isolated from the reaction mixture, but that this mixture can be directly employed to carry out step (3) in which a phenylhydrazone derivative is formed from the succinaldehydic acid. In particular, the small quantity of α-ketoglutaric acid produced in step (2) does not interfere with the reaction of step (3). In fact, both the by-product and the principal product can conveniently be isolated by forming their phenylhydrazone derivatives which will then separate as a thick oil from the rest of the reaction mixture. Then, if desired, this thick oil containing both the by-product and the principal product can be further purified or the two products separated before the cyclization step.

As will be noted from the previous equations, it is at this point in our process that it is determined what substituent groups if any the final indoleacetic acid product is to have. In other words, if phenylhydrazone itself is employed, the final product will be indoleacetic acid, while if a phenylhydrazone having substituents in the benzene ring is employed, the final product will be a correspondingly substituted indoleacetic acid. We have found that the phenylhydrazone can have a variety of substituent groups, and particularly may have one or two alkyl groups or halogen atoms as substituents.

In general, step (3) can be carried out by the usual procedures and techniques for reacting a phenylhydrazine with an acid aldehyde. For example, the desired phenylhydrazine can be dissolved in an aqueous acetic solution such as aqueous acetic acid and then added to the reaction mixture obtained from step (2) or to a solution of succinaldehydic acid recovered from the reaction mixture of step (2). Other acids such as hydrochloric can also be employed. In fact, we have found it desirable when an aqueous acetic acid solution of the phenylhydrazine is employed to add an additional mineral acid such as hydrochloric acid.

Upon the addition of the aqueous acetic solution of phenylhydrazine to the reaction mixture, only a slight mixing is required to produce the separation of a thick oil comprising mainly the desired succinaldehydic phenylhydrazone. However, if the reaction mixture from step (2) also contains α-ketoglutaric acid, the thick oil will also contain the phenylhydrazone derivative of this acid.

The oily layer containing the desired product may be separated by any suitable means such as decanting, etc. After its separation the oily product may be further purified by various well-known procedures which are applicable to similar materials, such as extracting, drying, etc. Also, any volatile solvents used in the reaction and partially retained in the oily layer can be removed by distillation, or other suitable means.

Although it is not necessary, if desired the by-product α-ketoglutaric acid phenylhydrazone can be separated when present from the succinaldehydic acid phenylhydrazone by differential extraction or other suitable separation processes. For example, we have found it can be separated by differential extraction with benzene, since the by-product is quite insoluble in benzene while the desired product is quite soluble. Thus, upon extraction of the oil layer with benzene, the desired product, succinaldehydic acid phenylhydrazone, will be contained in the extract. After this separation, the desired product may be further purified by methods such as extraction, recrystallization, etc. However, as previously pointed out this separation of the principal product and the by-product is not required. If desired, both products can be subjected together to the cyclization step which will next be discussed.

In step (4), recovered succinaldehydic acid phenylhydrazone from step (3), or the oily layer from step (3), which is preferably purified, is subjected to cyclization. While other cyclization reactants for this type of reaction can be used with a fair measure of success, we have found that ethanolic sulfuric acid produces excellent results when used as a cyclicizing agent. When ethanolic sulfuric acid is used, the cyclicized product produced is an ethyl ester of an indoleacetic acid, which can then be saponified to yield the salt of the desired indoleacetic acid, or the acid itself by acidification following saponification.

In general, the cyclization step is preferably carried out by forming a reaction mixture in which ethanol is employed as a solvent for the crude succinaldehydic acid phenylhydrazone together with a quantity of concentrated sulfuric acid. We have found that it is desirable to reflux the reaction mixture thus formed for several hours in order to complete the reaction. Generally, refluxing the reactants for about 5 hours has been found sufficient to complete the reaction.

Upon the completion of the cyclization we have found it desirable to subject the ester of the desired indoleacetic acid to purification before carrying out the saponification step. In general, this purification can be carried out by well-known procedures for purifying similar materials. For example, the reaction mixture from step (4) can be poured into water, whereupon an oily layer will separate containing the desired product. The oil layer can then be subjected to further purification by extraction, etc. We have found that ether is good as an extraction solvent for this oil layer since the esters of indoleacetic acid are quite soluble in ether, and will therefore predominate in the extract.

Following these purification procedures which are not especially critical and may be varied to a considerable extent, we have found that it is important to subject the purified oily layer to distillation. This distillation is carried out under reduced pressure, and the desired ester of indoleacetic acid is passed over to the collecting vessel as the distillate. We have found that regardless of what other purification procedures are used that this distillation step for purifying the ethyl ester of indoleacetic acid prior to saponification is quite critical, and that if it is omitted the yield of the final product will be decreased and in some cases no yield at all will be obtained.

After the purification of the ethyl ester of the desired indoleacetic acid, the distillate is saponified according to known procedures to produce a salt of indoleacetic acid. In general, the alkali metal hydroxides such as sodium hydroxide and potassium hydroxide are suitable for use as saponifying reagents. We have found it preferable to use an alcohol such as methanol or ethanol as a solvent in carrying out the saponification. For example, methanolic potassium hydroxide can advantageously be used. While not absolutely essential, we have found that refluxing of the reaction mixture containing the alkali metal hydroxide, solvent, and ethyl ester of indoleacetic acid is desired in accelerating the saponification reaction. When refluxing is utilized, the reaction will generally be complete in around one hour.

Following the saponification reaction, the solvent such as an alcohol can be removed and the product acidified to produce the desired indoleacetic acid. The product can then be further purified by known methods for similar materials, such as washing, recrystallization, etc. After sufficient purification, the desired indoleacetic acid will be obtained as a pure crystalline compound.

In order to facilitate the practicing of our invention, we wish to set forth the following illustrative examples, which show preferred embodiments of our invention.

EXAMPLE I

*Succinaldehydic acid m-chlorophenylhydrazone*

To 24.9 g. (0.20 mole) of glutamic acid (commercial grade) in 400 ml. of 0.5 N sodium hydroxide solution, 200 ml. of fresh 1 M sodium hypochlorite solution was added. The alkaline solution was stirred until it gave a negative test with starch-iodide paper, and acidified by the addition of 70 ml. of 3 N hydrochloric acid which resulted in evolution of carbon dioxide. The solution was heated to 50° and maintained at that temperature until the starch-iodide test was negative (50 minutes). A solution of 22.0 g. (0.20 mole) of phenylhydrazine in 50 ml. of 25% acetic acid was added and the reaction mixture was heated for 20 minutes on the steam bath. The reaction mixture was acidified to Congo red with hydrochloric acid, cooled, and extracted with 200 ml. of ether and with 100 ml. of ether. The combined ether extracts were extracted with 300 ml. of N NaOH. The basic solution was acidified with 10% hydrochloric acid. The phenylhydrazone was extracted with two 100 ml. portions of ether. The combined ether extracts were dried over sodium sulfate and distilled. The yield of crude succinaldehydic acid phenylhydrazone was 18 g. (47%).

EXAMPLE II

*Succinaldehydic acid m-chlorophenylhydrazone*

To a solution of 29.4 g. (0.2 mole) of glutamic acid in 400 ml. of 0.5 N sodium hydroxide was added 0.2 mole of freshly prepared sodium hypochlorite in 209 ml. of solution. The solution was warmed to 50° on the steam bath until a negative test was obtained with starch-iodide paper, and then acidified by the addition of 70 ml. of 3 N hydrochloric acid. Carbon dioxide was evolved during the acidification. The solution was maintained at 50° until the solution gave a negative test with starch-iodide paper (10 minutes). A solution of 17.1 g. (0.12 mole) of m-chlorophenylhydrazine dissolved in 50 ml. of 25% acetic acid was added. A thick oil separated immediately. Fifty ml. more of 3 N hydrochloric acid was added and the stirring continued for two hours while the reaction mixture was allowed to cool to room temperature. The oil was extracted with three 200 ml. portions of ether. The combined ether extracts were dried over sodium sulfate and distilled. All volatile solvents were distilled off on the steam bath by reducing the pressure with a water aspirator. Extraction of the oil with 200 ml. of benzene left 2.3 g., (0.0085 mole), (4.2% from glutamic acid), of crude α-ketoglutaric acid m-chlorophenylhydrazone melting 174° (dec.).

Concentration of the benzene extract to 25 ml. gave 13.1 g. of crystals M. P. 105°. Further concentration gave 11.2 g. of an oil which did not crystallize. An attempt to recrystallize the product, melting at 105°, from benzene gave 0.5 g. of crude α-ketoglutaric acid m-chlorophenylhydrazone, M. P. 173° (dec.), and 9.4 g. of the desired product M. P. 101–102°. Two recrystallizations from a water-ethanol mixture did not raise the M. P. All attempts to crystallize the oil fraction were unsuccessful. The yield, including the crude oil which was successfully used in a cyclization reaction, was 24.4 g. (54% based on the glutamic acid used).

*Analysis.*—Calcd. for $C_{10}H_{11}O_2N_2Cl$: Neut. equiv., 226.6; N, 12.34. Found: Neut. equiv., 226.2; N, 12.41; 12.50.

EXAMPLE III

*Succinaldehydic acid phenylhydrazone*

The same procedure was followed as in Example I, except that solid Chloramine-T was used in place of the sodium hypochlorite solution in an equivalent amount. The yield of succinaldehydic acid phenylhydrazone based on the glutamic acid was 67%.

EXAMPLE IV

*Indoleacetic acid*

Sixteen g. (0.083 mole) of crude succinaldehydic acid phenylhydrazone from Example I and a solution of 20 ml. of concentrated sulfuric acid in 180 ml. of absolute ethanol were refluxed five hours under nitrogen. The cooled solution was poured into 1 l. of water and the oil which separated was extracted with three 200 ml. portions of ether. The combined ether extracts were dried over sodium sulfate containing a small amount of potassium carbonate to neutralize any acid in the ether. Distillation of the ether and alcohol left 12.7 g. of an orange oil.

The crude ethyl indole-3-acetate was purified by vacuum distillation. The fraction distilling 160–180° at 0.2 mm., weight 7.2 g., was collected as product. A second fraction distilling 180–220° at 0.2 mm. weighed 1.5 g. Saponification of this second fraction gave 0.85 g. of 2-carboxyindole-3-acetic acid, which melted 231–233° (dec.) after two recrystallizations from water.

*Analysis.*—Calcd. for $C_{11}H_9O_4N$: Neut. equiv. 109.5; N, 6.40. Found: Neut. equiv., 110 (potentiometric); N, 6.32 and 6.34.

The principal product was saponified by refluxing one hour with 100 ml. of 10% methanolic KOH. The solution was diluted with 200 ml. of water and distilled until the temperature of the vapor reached 99°. The alkaline solution was extracted once with 50 ml. of ether. Most of the ether was distilled out of the aqueous layer by reducing the pressure with an aspirator. Acidification of the aqueous solution with 10% HCl gave a light brown crystalline product. The crystals were filtered off, washed three times with water and air-dried in the filter. The product was washed with a small amount of chloroform, dried, and recrystallized from water (Norit A). This gave 1.82 g. of indoleacetic acid, M. P. 164–165° (dec.). A mixed melting point with an authentic sample of indoleacetic acid showed no depression. The mother liquors were combined and extracted with three 30 ml. portions of ether. The combined ether extracts were dried over sodium sulfate and distilled. The residue was extracted with 10 ml. of chloroform. The crystals were filtered off and washed with three 5 ml. portions of chloroform. This gave 1.47 g. of product, M. P. 155–160°. After one recrystallization from 20 ml. of water this product melted 165–167° (dec.), and weighed 1.21 g. The total yield of pure indoleacetic acid was 3.03 g. (21%).

EXAMPLE V

*Cyclization of succinaldehydic acid p-chlorophenylhydrazone*

A solution of 11.3 g. (0.050 mole) of crude succinaldehydic acid p-chlorophenylhydrazone, 30 ml. of conc. sulfuric acid, and 270 ml. of absolute ethanol was refluxed in a nitrogen atmosphere for five hours. The cooled solution was poured into 600 ml. of water and the oil which separated was extracted with five 200 ml. portions of ether. The combined ether extracts were dried over sodium sulfate containing a small amount of potassium carbonate to neutralize any acid in the ether. Distillation of the ether and alcohol left 10.1 g. of a dark red oil. This was transferred to a short-path distillation apparatus, made from a large test tube, and distilled. The product came over rapidly at a bath temperature of 210–220° at 0.2 mm. The distillate was a yellow oil weighing 5.8 g. The distillate was saponified by refluxing one hour with 60 ml. of 10% methanolic potassium hydroxide. One hundred ml. of water was added and the methanol distilled off under reduced pressure. The aqueous solution was extracted with two 40 ml. portions of ether, and the extract was discarded. Acidification of the aqueous solution gave a red oil which crystallized to sticky brown plates. After washing with chloroform gave dry crystals with M. P. 156–158°, weight 2.52 g. (24%). The product was recrystallized from water (Norit A). The acid separated in beautiful white needles, M. P. 158–159½°, weight 2.04 g. The yield of pure 5-chloroindole-3-acetic acid was 19½%.

EXAMPLE VI

*Cyclization of succinaldehydic acid m-chlorophenylhydrazone*

A solution of 7.2 g. (0.0317 mole) of pure succinaldehydic acid m-chlorophenylhydrazone from Example II, 21 ml. of conc. sulfuric acid and 200 ml. of absolute ethanol was refluxed in a nitrogen atmosphere for six hours. The cooled solution was poured into one l. of water and the oil which separated was extracted with three 150 ml. portions of ether. The combined ether extracts were washed with half-saturated sodium bicarbonate solution and dried over sodium sulfate. Distillation of the ether and alcohol left a dark oil, which was transferred to a molecular still. The ester came over at 140–150° at 0.05 mm. The distillate, 3.5 g. of a yellow oil, was saponified by refluxing for 40 minutes with 25 ml. of 10% ethanolic sodium hydroxide solution containing just enough water to dissolve the base. The alkaline solution was diluted with 50 ml. of water and distilled until the temperature of the vapor reached 98°. The cooled solution was extracted with a small amount of ether which was discarded. The aqueous solution was shaken with 0.2 g. of Norit A and filtered. Acidification of the filtrate precipitated an oil which crystallized on standing several hours. The sticky crystals were filtered off and dried. Extraction of the product with 5 ml. of chloroform left 1.6 g. (24%) of acid melting 151–160°. The crude acid was treated with a small amount of hot benzene, and an insoluble fraction was filtered off. This acid, weight 0.4 g., was recrystallized from water. The product separated in plates M. P. 185–186° (dec.). A mixed M. P. of this compound with an authentic sample of 6-chloroindole-3-acetic acid showed no depression. Concentration of the benzene gave crystals (plates) of an eutectic mixture of the 4- and 6- chloroindole-3-acetic acids, M. P. 154–159° (dec.). The melting point of this mixture was not depressed by either the 4- or 6-chloroindole-3-acetic acids.
*Analysis.*—Calcd. for $C_{10}H_8O_2NCl$: Neut. equiv., 209.6; N, 6.69. Found: Neut. equiv., 211; N, 6.50, 6.78.

EXAMPLE VII

*5,7-dichloroindole-3-acetic acid*

Following the methods and procedures as set out in Examples II and VI, except that 3,5-dichlorophenylhydrazine was employed, 5,7-dichloroindole-3-acetic acid was produced in a yield of 13% based on the succinaldehydic acid phenylhydrazone used in the cyclization reaction. An analysis of the product obtained disclosed that it had an equivalent of 249 to a calculated neutral equivalent of 244.1, while nitrogen analysis found an average percent of 5.69 to a calculated percent of 5.73.

EXAMPLE VIII

*5-methylindole-3-acetic acid*

Following the methods and procedures of Examples II and VI, except that p-tolylhydrazine was used, 5-methylindole-3-acetic acid was produced in a yield of 31% based on the succinaldehydic acid phenylhydrazone used in the cyclization reaction.

While in the foregoing specification we have set out specific details of our process, it will be apparent to those skilled in the art that many of the details set forth can be varied widely without departing from the spirit of our invention.

We claim:
1. In a process for producing indoleacetic acids from glutamic acid, the steps of mixing glutamic acid and a basic aqueous solution of a chlorine bleaching compound, acidifying the resulting mixture with a strong acid to form succinaldehydic acid, mixing the succinaldehydic acid thus formed with a phenylhydrazine in the presence of a mutual solvent for the reactants to form a succinaldehydic acid phenylhydrazone, separating the succinaldehydic acid phenylhydrazone, and then cyclizing the succinaldehydic acid phenylhydrazone by dissolving it in a saturated lower aliphatic alcohol acidified with a strong acid as a catalyst and heating the resulting mixture at temperatures promoting the cyclization.

2. In a process for producing indole-3-acetic acids from glutamic acid, the steps of mixing glutamic acid and a basic aqueous solution of a chlorine bleaching compound, acidifying the resulting mixture with a mineral acid to form succinaldehydic acid, mixing the succinaldehydic acid thus formed with a phenylhydrazine in the presence of a mutual solvent for the reactants to form an oily layer containing a succinaldehydic acid phenylhydrazone, separating said oily layer containing the succinaldehydic acid phenylhydrazone, and then cyclizing the separated succinaldehydic acid phenylhydrazone to form an ester of an indole-3-acetic acid by mixing said compound with ethanolic sulfuric acid as a catalyst while heating the reaction mixture at temperatures promoting the cyclization.

3. In a process for producing indoleacetic acids from glutamic acid, the steps of mixing glutamic acid and an alkali metal hydroxide and an alkali metal hypochlorite, acidifying the resulting mixture with a mineral acid to form succinaldehydic acid, mixing the succinaldehydic acid thus formed with a phenylhydrazine in the presence of a mutual solvent for the reactants to obtain a succinaldehydic acid phenylhydrazone, recovering the succinaldehydic acid phenylhydrazone, and effecting a ring closure of the succinaldehydic acid phenylhydrazone by dissolving it in a saturated lower aliphatic alcohol acidified with a strong acid as a catalyst and refluxing the resulting mixture.

4. In a process for producing indoleacetic acids from glutamic acid, the steps of mixing glutamic acid and an alkali metal hydroxide and a compound selected from the group consisting of alkali metal hypochlorites and sodium p-toluene-sulfo-chloramine, acidifying the resulting mixture with a mineral acid to form succinaldehydic acid, mixing the succinaldehydic acid with an aqueous acidic solution of a phenylhydrazine to produce a succinaldehydic acid phenylhydrazone concentrated in an oily layer, separating the layer containing the succinaldehydic acid phenylhydrazone, cyclicizing the recovered compound to form an ester of an indole-3-acetic acid by refluxing said compound with ethanolic sulfuric acid, and saponifying the said ester to yield the salt of the desired product.

5. The process of claim 4 in which the ester of indoleacetic acid is purified by distillation under reduced pressure prior to saponification.

6. In a process for producing indoleacetic acids from glutamic acid, the steps of mixing glutamic acid and a compound selected from the group consisting of sodium hypochlorite and sodium p-toluene-sulfo-chloramine in an aqueous solution of an alkali metal hydroxide, acidifying the resulting mixture with a mineral acid to form succinaldehydic acid, mixing the succinaldehydic acid with an aqueous acidic solution of a phenylhydrazine having the general structural formula

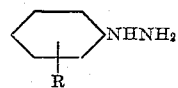

wherein R represents at least one member selected from the group consisting of hydrogen, alkyl, and halogen to produce a succinaldehydic acid phenylhydrazone, recovering the succinaldehydic acid phenylhydrazone, cyclicizing the recovered compound to form an ester of an indole-3-acetic acid by refluxing said compound with ethanolic sulfuric acid, and saponifying the said ester to yield the salt of the desired product.

7. In a process for producing indoleacetic acids from glutamic acid, the steps of mixing glutamic acid and a compound selected from the group consisting of sodium hypochlorite and sodium p-toluene-sulfo-chloramine in an aqueous solution of an alkali metal hydroxide, acidifying the resulting mixture with a mineral acid to form succinaldehydic acid, mixing the succinalydehydic acid with an aqueous acidic solution of a phenylhydrazine having at least one halogen atom substituted in the benzene ring to produce a succinaldehydic acid phenylhydrazone, cyclicizing the recovered compound to form an ester of an indole-3-acetic acid by refluxing said compound with ethanolic sulfuric acid, and saponifying the said ester to yield the salt of the desired product.

References Cited in the file of this patent

UNITED STATES PATENTS 2,222,344   Bauer et al. _____ Nov. 19, 1950

OTHER REFERENCES

Stevens et al.: Jr. Am. Chem. Soc., vol. 70, pp. 2263–5 (1948).

Ellinger: Berichte, vol. 38, pp. 2884–88 (1905).